United States Patent [19]

Huang

[11] Patent Number: 5,793,906
[45] Date of Patent: Aug. 11, 1998

[54] SWITCHING USING OPTICAL TUNNELS

[75] Inventor: Alan Huang, Pasadena, Calif.

[73] Assignee: NEC Research Institute, Inc., Princeton, N.J.

[21] Appl. No.: 770,496

[22] Filed: Dec. 20, 1996

Related U.S. Application Data

[63] Continuation of Ser. No. 520,527, Aug. 29, 1995, abandoned.

[51] Int. Cl.$^6$ ........................................ G02B 6/00
[52] U.S. Cl. .................... 385/17; 385/113; 359/117; 250/208.2; 250/208.4
[58] Field of Search .................. 385/133, 17, 123; 250/551, 208.2, 208.4, 229; 359/117, 173; 356/39; 350/96.1; 362/268

[56] References Cited

U.S. PATENT DOCUMENTS

| | | | |
|---|---|---|---|
| 4,065,644 | 12/1977 | Shinosky, Jr. | 359/117 |
| 4,600,302 | 7/1986 | Sage, Jr. | 356/39 |
| 4,744,615 | 5/1988 | Fan et al. | 350/96.1 |
| 4,918,583 | 4/1990 | Kudo et al. | 362/268 |
| 5,059,917 | 10/1991 | Stephens | 385/123 |
| 5,185,716 | 2/1993 | Mehdipour | 365/10 |
| 5,218,660 | 6/1993 | Omata | 385/116 |
| 5,325,224 | 6/1994 | Lang et al. | 359/117 |
| 5,546,209 | 8/1996 | Willner et al. | 250/551 |
| 5,576,873 | 11/1996 | Crossland et al. | 385/17 |

*Primary Examiner*—Rodney B. Bovernick
*Assistant Examiner*—Yisun Song
*Attorney, Agent, or Firm*—Jeffery J. Brosemer; Philip J. Feig; Arthur J. Torsiglieri

[57] ABSTRACT

In a supercomputer that employs a large number of processors operating in parallel, groups of processors are assembled in clusters. Each processor in a cluster is provided with an array of lasers, a different one targeted for a particular detector associated with a specific processor of a different cluster. The detectors associated with the processors in the different cluster are assembled into an array of detectors. A processor wishing to communicate with a processor in a different cluster excites the laser in its associated array that is targeted to the detector of the processor with which it intends to communicate. The patterns of light of the various laser arrays are superimposed into one pattern focused on the detector array by means of an optical tunnel and a spherical lens.

1 Claim, 1 Drawing Sheet

SWITCHING USING OPTICAL TUNNELS

This is a continuation of application Ser. No. 08/520,527 filed Aug. 29, 1995 now abandoned.

FIELD OF THE INVENTION

This invention relates to optical interconnection apparatus and more particularly to such apparatus that utilizes an optical tunnel device.

BACKGROUND OF THE INVENTION

The use of optical beams to transmit signals in free space has become of growing interest in electronics because of its relative simplicity. The avoidance of conductive leads to provide interconnections between components of a system is an important advantage that can be gained by the use of optical beams. Moreover, the ease with which interconnections can be switched when the signals are transmitted by optical beams has further enhanced the attraction of optical beams as a transmission medium in electronics, especially where space is confined so that changes in conductive interconnections are not easily made.

An optical element that has been available for some time but has been little utilized in electronics is the optical tunnel.

An optical tunnel in its basic form is a relatively long square hole in a block of glass that has been silvered to make the hole walls highly reflective. Generally the length of the hole is long compared to its width and height. If a transparency is mounted at one end of the hole and illuminated, and a spherical lens is positioned at the other end, multiple images of the transparency can be viewed on screen positioned beyond such other end at the focal plane of the lens. One of images will correspond to the image transmitted without wall reflections through the optical tunnel and all the other images will correspond to images that have experienced one or more wall reflections in the optical tunnel. Apparatus of this kind has been used in making masks for use in the photolithographic processes involved in the manufacture of integrated circuit devices.

A less recognized property of an optical tunnel is its ability, when used in reverse, to overlap a plurality of duplicate images, properly positioned, into a single image. For example: if the screen in the earlier example is replaced by multiple images of a scene and these images are projected through a spherical lens to pass through the optical tunnel, a single image, which is the resultant of the overlapping of the multiple images, can be produced on a screen properly positioned beyond the end of the tunnel. This property of an optical tunnel appears to have been little used outside the printing industry.

SUMMARY OF THE INVENTION

A feature of the invention is the inclusion of an optical tunnel for its ability to integrate a plurality of separate images into a single image.

The invention will be described with particular reference to a optical interconnection network for use in a parallel computation system of the general kind described in in application Ser. No. 08/340,680, filed Nov. 16, 1994, assigned to the same assignee as the instant application.

That application describes a supercomputer that includes a plurality of n processors operated in parallel and uses optical beams for passing signals between the processors. The processors are grouped in clusters, each cluster being formed on a separate circuit board. Communication between processors in different clusters is by way of optical beams.

To this end, each processor that will need to transmit information to a processor in a different cluster is provided with a transmitter that includes a two-dimensional array of diode lasers. Each processor that will need to receive information from a processor in a different cluster has associated with it a photodetector. The photodetectors associated with each of the processors in a cluster are formed into a two-dimensional array of photodetectors. When a processor in one cluster wishes to communicate with a particular processor not in its cluster, it sends the signal to be communicated to the laser diode of its array that selectively targets the detector associated with the processor with which it wishes to communicate. Effectively, when a processor excites a particular laser, it connects itself to the processor whose detector has been targeted by the laser. A relatively complex optical system of beamsplitters and lenses is used to direct the various emitted laser beams to the targeted photodetectors.

An optical tunnel used in accordance with the invention can help simplify the optics needed to get the light beams from the lasers in one cluster to photodetectors in another cluster.

In accordance with the invention, the diode laser arrays associated with the individual processors in a transmitting cluster are assembled into a single two-dimensional array of laser arrays and the photodetectors of the individual processors in a cluster are assembled into a single two-dimensional array of photodetectors. Then a spherical lens and an optical tunnel are used to collect the light patterns emitted by the individual processor diode arrays and supply them to the input end of the optical tunnel. At the output end of the optical tunnel, there will be available a single two-dimensional array of light patterns representing the superposition of the light patterns of the diode laser arrays of all the processors in the transmitting cluster, which superposed patterns is applied to the two-dimensional array of photodetectors of the receiving cluster.

In this way, optical paths, which may be used to convey signals, are established between one or more lasers and one or more detectors. Moreover, by turning on different lasers different paths are formed, thereby effecting a switching in the paths that are established.

The invention will be better understood from the following more detailed description in which

DETAILED DESCRIPTION OF THE INVENTION

Figure 1:
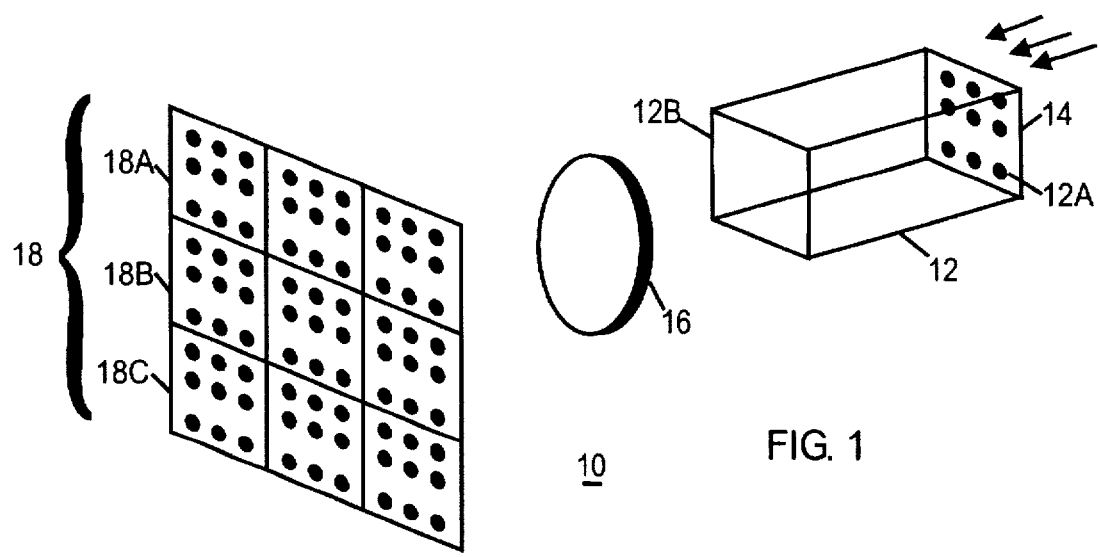
FIG. 1 illustrates the use of an optical tunnel to create multiple copies of an image.

With reference now is the drawing, the arrangement 10 depicted in FIG. 1 includes an optical tunnel 12. This advantageously may comprise four identical rectangular panels of glass assembled to form a hollow structure of square cross section as depicted. Generally, the length of the tunnel is at least several times longer than the height or width of the tunnel. The interior walls of the tunnel are silvered to be highly reflective of light of is the wavelengths being used. At the input end 12A of the tunnel there is provided a transparency 14, which has a pattern to be replicated. The transparency 14 is irradiated with light from a source (not shown) that passes through the pattern and this light is guided through the tunnel by the reflecting walls of the tunnel to exit at the output end 12B of the tunnel. Each reflection forms an additional image of the pattern. A spherical lens 16 spaced from output end 12B of the tunnel is used to intercept the images exiting from the tunnel 12 and to focus them onto screen 18 where they can be observed. It will be found that a two dimensional array 18A, 18B, 18C etc. of the same pattern in the transparency 14 will be displayed on screen 18.

Because of the reciprocal properties of light, the arrangement 10 can be operated in reverse to combine a number of images positioned in the places of the various images of the pattern seen on screen 18 into a single overlapping image on a screen at the position of original the transparency.

Figure 2:
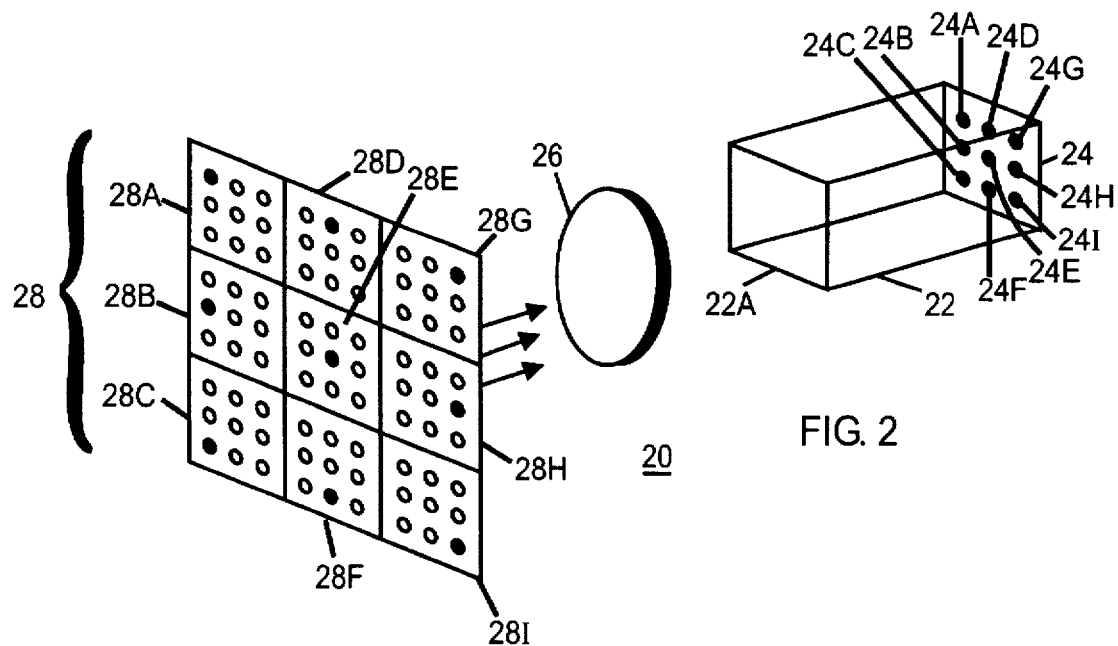
FIG. 2 illustrates the reciprocal process of mapping a plurality of sub-images into a signal image representing the overlap of the sub images in which each of the sub images is provided by the individual light pattern from a different array of the diode laser arrays and the single image is applied to a two-dimensional array of photodetectors, in accordance with the invention.

This principle is used in the invention, as illustrated in the arrangement 20 shown in FIG. 2. In this arrangement, nine semiconductive chips 28A–28I, each of which includes a 3×3 square array of surface emitting layers, are formed into a 3×3 array of chips, which is positioned at the place of the screen in the FIG. 1 arrangement. Each of the nine chips is associated with a different processor in a cluster of processors. Each of the nine lasers in a chip is intended to target selectively a different one of nine detectors in an array 24 of nine photodetectors 28A–28I, each of which is coupled to a different processor in a group of nine processors that are in a different cluster. For a transmitting processor in the first cluster to transmit to a receiving processor in the second cluster, the processor in the first cluster excites the laser, in the diode laser array assigned to it that is targeted on the detector of the detector array that is coupled to the intended receiving processor of the second cluster.

The various optical beams emitted by the excited lasers in the sending cluster are intercepted and combined by the spherical lens 26, and then supplied to the input end of the optical tunnel 22 and focused on a common plane at the output end where there is positioned the array 24 of photodetectors that are coupled to the processors of its cluster. Because of the reciprocal nature of the optical process, the combination of the spherical mirror 26 and optical tunnel 22 will superpose the separate light patterns of each of the chips into one pattern. In particular, if each processor in the first cluster is seeking to communicate with a different processor of the second cluster, each chip in the array of nine chips will have one laser excited, the nine lasers excited will form a pattern of nine discrete beams, one from each chip, and these nine beams will emerge as nine discrete beams at the output end of the tunnel and excite the nine detectors of the array 24 associated with the nine processors of the second cluster. Typically, only one laser in a transmitting chip is emitting at any given time, as would be the case if each processor is communicating with only one receiving processor at a time. However, if desired, the arrangement could be changed to permit a given processor in a cluster to fan out its output to more than one processor at a given time. In such a case, the lasers targeting the detectors of each of the processors to be connected could be excited at the same time to have two separate beams emitted by a chip, each targeted at a different detector.

Similarly, each processor typically would be receiving signals from no more than one processor at a given time, so that its detector would not be targeted by more than one laser at a given time. However, if it is intended that a processor receive signals from more than one processor at a given time, this could be achieved by having the processors that wish to communicate with it excite lasers of different wavelengths. This can be done by having each array of diode lasers emit at a different wavelength. Thereafter, the signals of different wavelengths from the different lasers could be separated after receipt by filters, in the manner usual in frequency division multiplexing.

It should be apparent that the size and number of laser arrays can be chosen as desired and that the number of chips per array need not exactly match the number of arrays. It should also be apparent that all nine of the laser arrays of a cluster could be formed in a single chip with each processor in the cluster being assigned a different array of lasers of the chip. It is also desirable for good superposition that the arrays to be combined be sufficiently alike that good superposition is feasible.

What is claimed is:

1. An interconnection network for optically coupling a group of transmitters with a group of receivers such that particular ones of the transmitters are optically coupled only to particular ones of the receivers, said interconnection network comprising:

a two-dimensional array of diode laser chips, wherein each one of said laser chips is associated with a particular one of the transmitters and includes a two-dimensional array of diode lasers which lasers match and are in a one-to-one correspondence with a two-dimensional array of photodetectors;

the matching, two-dimensional array of photodetectors, a different photodetector being associated with a different one of said receivers, wherein said different photodetector at the j,k position of the two-dimensional array of photodetectors corresponds with each of the diode lasers at the j,k position of each of the laser chips-, a single optical tunnel having an input end and an output end and positioned along an optical path between the two-dimensional array of laser chips and the two-dimensional array of photodetectors; and a spherical lens, positioned between the two-dimensional array of laser chips and the input end of the optical tunnel such that light emitted from the diode laser in the j,k position in any one of the laser chips passes through the spherical lens and into the input end of the optical tunnel where it is imaged only on the photodetector in the j,k position of the array of photodetectors positioned at the output end of the optical tunnel.

* * * * *